Patented Feb. 14, 1939

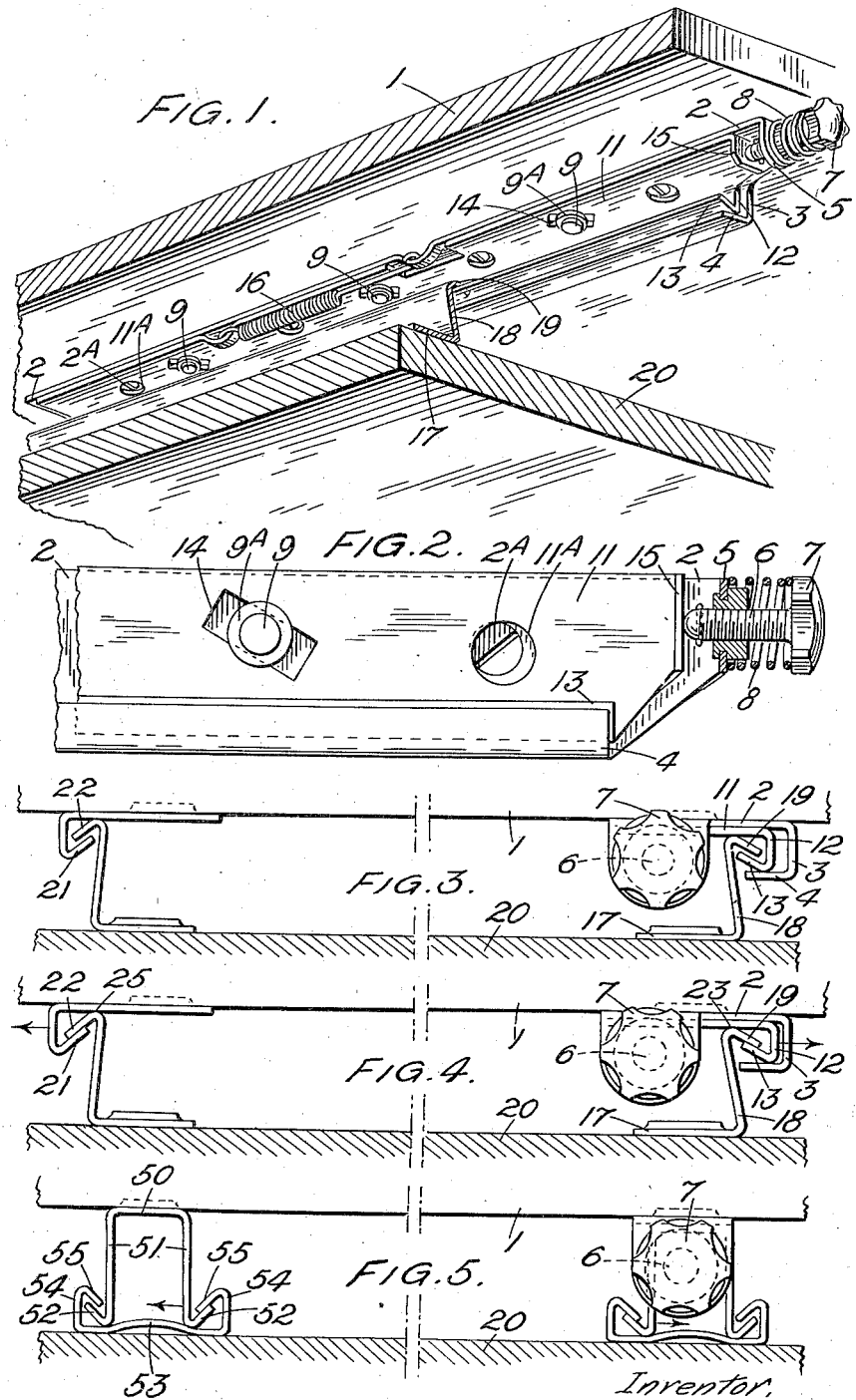

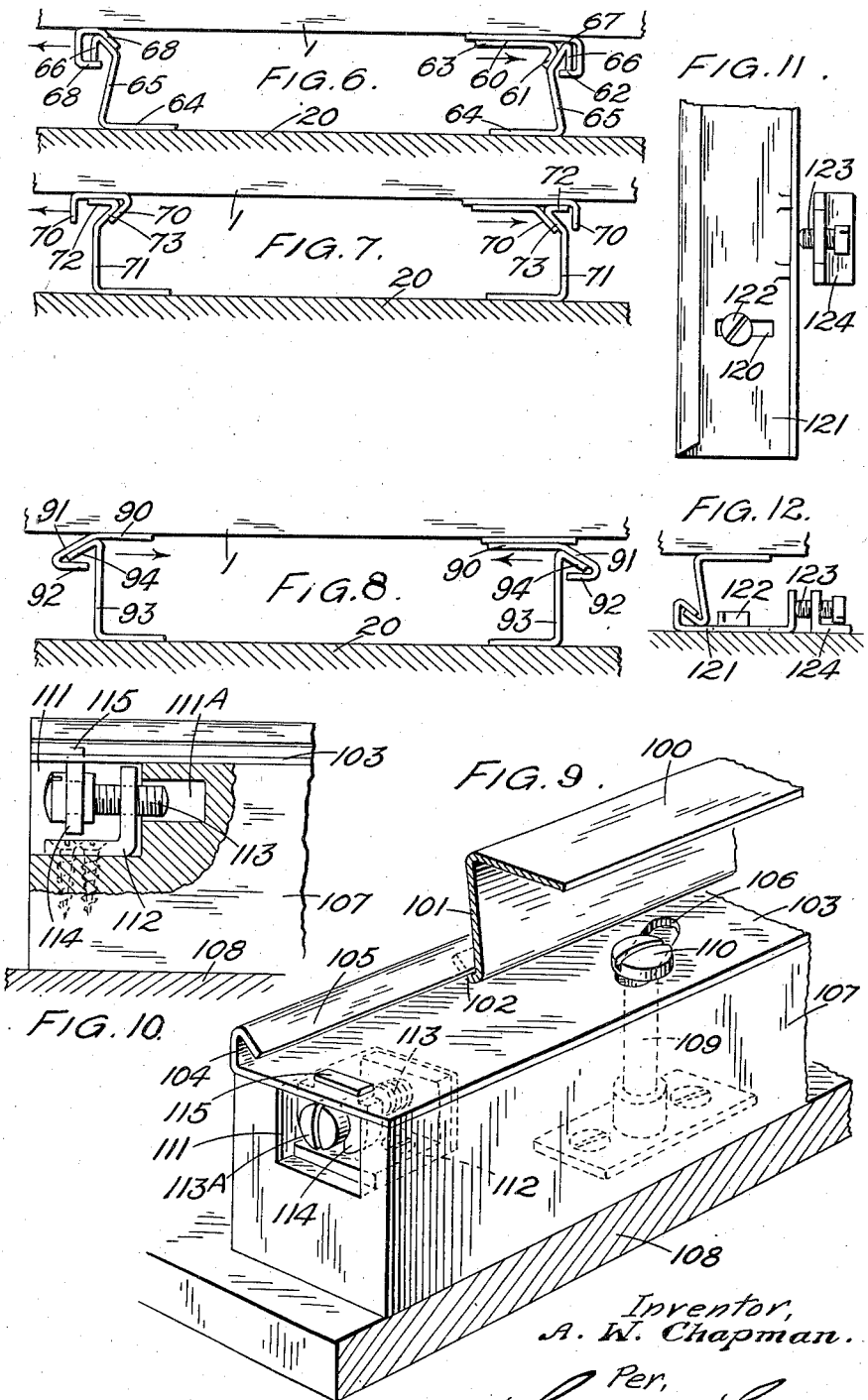

2,147,523

UNITED STATES PATENT OFFICE 2,147,523

SLIDE, SLIDE LOCKING DEVICE AND THE LIKE, PARTICULARLY FOR SEATS OF VEHICLES

Arthur William Chapman, London, England

Application July 19, 1935, Serial No. 32,306
In Great Britain July 19, 1934

11 Claims. (Cl. 155—14)

This invention relates to slides and to locking devices for slides, such as are frequently used for the mounting of seats in automobiles and the like in order to afford some degree of adjustment. It is found that it is not easy to make a form of slide which, whilst providing for free motion at times and being easy to operate, will at other times not suffer from rattling; it may also be desirable to provide for fairly fine adjustments of positioning. The invention relates more particularly to that class of slide wherein channel or like sections of metal form the actual slides, and interengage usually by having bent-over or flanged edges. In some such cases there are provided parallel rails each giving a single bearing surface, and laterally disposed on the seat frame and on the floor to which it is to be secured, and in other cases rails are provided each giving a plurality of bearing surfaces, but otherwise similarly disposed. Positive locking means are often provided comprising some form of spring-pressed trigger or hand-operated catch engaging indentations or perforations. Such locking means may be used if required, together with the present invention, but on the other hand the necessity therefor may in some circumstances be found to be avoided. A primary object of the present invention is to provide means whereby the slide members on the seat and those on the floor may be brought into firm contact, preferably with a pressure which acts in the same sense as that in which probable loads on the seat will act so as to prevent rattling when the seat is out of use, and to provide for at least some degree of locking so that the seat will not shift.

According to this invention, at least one of the slide members of a seat or the like is provided with means whereby it may be forced laterally. The effect of this is to bind the slides frictionally, and it may further be provided that by virtue of the lateral stress set up, inclined surfaces of a slide or slides may cause them to be loaded with some degree of pressure in the same sense as that in which they would be loaded, for example, by the weight of the occupant of a seat.

The invention may be particularly applicable in slidable seat mechanism in which slides are adapted to move one upon the other with line contact produced by a convex surface of a bend of one edge of one slide, contacting with a substantially flat or differently curved surface of a complementary slide, and in which such slides are held against separation in every transverse direction by reason of their bent edges interlocking.

According to this invention, in sliding seat and like mechanisms there are provided at least two parallel rails or guides and complementry engaging members, one of which rails, or one of which complementary members, is adapted to be forcibly displaced in the plane of parallelism, so as to engage rail or guide and member more firmly. The movement in the plane of parallelism therefore virtually alters the gauge of rails, or of members complementary thereto. The invention includes the provision of a type of rail and engaging member which, when forcibly engaged in the above-mentioned manner, will produce a component of force in the direction at right angles to the plane of parallelism, and preferably this is arranged to act in the same sense as the weight of an occupant of a seat, and is brought about by the inclination of engaging flanges which form the rails. These flanges, which are relatively slidable, are mutually retentive in preferably all senses of direction transverse to the direction of sliding. The invention includes the provision of means for altering the gauge in the manner above mentioned by endwise or longitudinal movement of a rail guide or engaging member, and inclined or cam-like surfaces to produce a lateral component of such movement. The simplest form of this is inclined slots engaged by anchored pins.

The invention may be more clearly understood by the following descriptions of examples of it.

In Figure 1 of the accompanying drawings, which are diagrammatic, is shown in perspective and partly sectioned, a seat slide of which one element is secured to the bottom board of a seat, and the other is mounted upon the floor, for example of an automobile;

Figure 2 is an enlarged fragmentary under plan of the device of Figure 1 with a detail in section;

Figure 3 diagrammatically illustrates an end view of the arrangement of Figure 1 in what may be termed "free" position;

Figure 4 is a similar view in binding position;

Figure 5 illustrates a very similar device employing a modified form of slide;

Figure 6 is an end diagram of a further modified slide, as are also Figures 7 and 8;

Figure 9 is a fragmentary perspective view of alternative operating means employing a still further form of slide;

Figure 10 is a fragmentary side elevation of a detail of Figure 9 enlarged;

Figure 11 is a further fragmentary plan diagram showing an alternative mode of operation; and Figure 12 an end diagram of Figure 11.

In the case of Figures 1 to 4, the seat member 1 has secured to it a foundation rail 2 with a depending flat vertical wall 3 and an inturned flange 4 continuing the wall 3. This foundation member has at one end a downturned lug 5 in which is threaded a bolt 6 with a finger head 7 and a light compression spring 8 to prevent rattle. For convenient operation the thread is preferably left-handed. The foundation member has rigid with it downwardly projecting studs 9 with flat heads preferably carrying washers 9A. These hold slidably against the part 2 a slide member 11 in the form of a channel rail with a wall 12 at right angles to the flat part 11, which wall carries a flange 13 which is partially doubled back at an acute angle to the wall 12. The part 11 has holes in it, for example at 11A, for access to screws 2A which secure the part 2 to the part 1. The studs 9 project through the part 11, through cut-away slots shown at 14, the major dimension of which is inclined to the length of the channel 11, 12, 13. The part 11 has at its end a bent-down lug 15 against which the end of the bolt 6 is adapted to bear. Between the parts 11 and 2 there is secured a tension spring 16 tending to urge the channel 11 lengthwise in such a manner that by virtue of the inclination of the slots 14 the wall 12 will approach the wall 3. By screwing on the head 7 of the bolt 6, through the axial displacement of the bolt 6, through the medium of lug 15, will consequently move the channel 11 against the influence of the spring 16, whereby the wall 12 will depart from the wall 3, the whole channel rail being displaced laterally but in parallelism with the foundation part 2. The whole construction so far described virtually comprises one slide member of a pair of interengaging slides; in the device illustrated in Figures 1 and 2 the complementary slide member or rail is shown as having a base part 17 adapted to be attached to the floor 20, an upstanding wall part 18 and a flange 19 bent over by an acute angle similarly to the flange 13, and so as to engage the flange 13 retentively, but to allow sliding thereof. This can perhaps be more readily seen in Figures 3 and 4, where the same parts are numbered in the same way. The nature of the engagement between the flanges 13 and 19 can clearly be seen in these figures, and from the slight difference between Figures 3 and 4 it will be seen that when the part 11 is allowed to move longitudinally and obliquely by the rotation of the bolt 6 and the flange 12 moves toward the flange 3 by virtue of the spring 16. Then the flanges 13 and 19 bear against one another and by their inclination produce a vertical pressure between 18 and 11 and a lateral pressure in the direction indicated by the arrows in Figure 4. At the left-hand side of Figures 3 and 4 can be seen the other pair of interengaging slides which are preferably of similar form to those described, that is, they comprise interengaging bent-over flanges 21 and 2 secured respectively to the seat 1 and floor 20, these flanges being at an acute angle again. From Figure 4 it can be seen that when the flanges 13, 19, are tightened against one another, they not only establish firm contact between themselves, but by a vertical resultant force due to their inclination, they cause binding at the point 23 which represents the line contact on which the seat will slide when so required. It will be noted that the engagement here is a pressure in the same sense as would result from a weight upon the seat.

The effect above described produces a further or secondary effect between the flanges 21, 22, which can be seen at the left of Figure 4, in that these two flanges will likewise bind and will in their case produce vertical pressure at the point or line indicated at 25; it follows that the whole seat, of which 1 is the bottom, is held firmly down, and rattling may be obviated. The degree of binding which is accomplished is, of course, regulated by the bolt 6 and spring 16, and the spring 16 is therefore arranged, having regard to inclination of the slots 14, to exert sufficient force for maximum binding requirements. It will be observed that the general effect is virtually to vary the gauge of those rails which are attached to the seat, so that they bind upon the complementary rails which are attached to the floor.

Figure 5 illustrates diagrammatically an alternative form of channel rail. The operative mechanism is intended to be substantially the same as that of Figures 1 and 2. In this case however, instead of single engaging flanges comprising each rail, they are doubled, so that each rail presents two line contact rubbing surfaces for ordinary sliding, and may perhaps produce more points of binding, when binding is required, than the simpler construction of the previous figures. The upper rails in this case are inverted U-section channels comprising a base 50, walls 51 and upturned flanges 52. The flanges 52 are held by the lower rail which comprises a base 53, walls 54 and flanges 55. As illustrated, the device is in the binding condition.

Figure 6 shows a further type of rail in which the seat bottom 1 has a built up rail 60 with retentive flanges 61, 62, and in which the flange 61, together with its base part 63, is adapted to move laterally in relation to 60, 62, so as to bind upon the bottom rail which has base 64, wall 65 and flange 66 with line contact bearing at 67. At the other side of the seat the upper rail comprises a unitary channel having flanges 68 and the lower rail is the same as the first lower rail.

Figure 7 shows a further variant in which the upper rails have flanges 70 and the lower rails have walls 71 and a flat topped flange 72, in which respect they depart from the line contact bearing surface present in other constructions. In this case the walls 71 have inclined parts 73 to cooperate with the inclined flanges 70, so that the action is again one which will produce a vertical component of pressure as well as the lateral binding effect.

Figure 8 shows upper members having foundation parts 90, one of which is movable laterally, and these parts have acutely inclined walls 91 with acutely inturned flanges 92 which thus come approximately in parallel plane to foundations 90. The lower elements have walls 93 and slightly downwardly turned flanges 94, engaging in the angle between the walls 91 and flanges 92. In this case it is intended that one (the movable) upper member, be forcibly urged inwards upon requirement; that is to say, so that the upper members reduce their gauge and therefore contract upon the lower members, producing binding.

In the above described constructions it may be found desirable so to form the members that they possess certain inherent resilience allowing the wall parts of the rails to deflect angularly under the lateral loads applied to them, but normally, in order that they may adequately withstand the weight load on the seat, they should be substantially vertical in plane, or sufficiently robust to resist collapse under these loads.

The device of Figures 9 and 10 is merely an alternative mounting of rail with modified operating means. These figures incidentally serve to demonstrate the fact that the position of the movable and fixed rails is interchangeable, and that the fixed rail may be the uppermost. In this construction the fixed upper rail comprises a foundation part 100, substantially vertical depending wall 101, and acutely upturned flange 102. The lower rail comprises a longitudinally and laterally movable foundation part 103, vertical upstanding wall 104, and downwardly directed flange 105 complementary to the flange 102. The lower rail has inclined slots as at 106, and is anchored slidably to a wooden batten 107 rigidly attached to the floor 108 by pins 109 with heads 110 sufficiently large to prevent disengagement of the slots 106. A mortise is formed at 111 in the end of the batten 107, and is fitted with an L-shaped plate 112 in which is threaded the inner end of a screw 113, upon which straddles a substantially U-shaped metal block 114 engaged by a groove of the screw or beneath the head 113A thereof. The block 114 has an upstanding lug 115 positively engaging a corresponding hole in the foundation part 103. This is an economical and compact construction whereby rotation of the head 113A causes longitudinal and therefore lateral movements of the lower slide, and therefore causes the required firm engagement. The mortise 111 is countersunk at 111A to receive the inner end of the screw 113, as can be seen in Figure 10.

Figures 11 and 12 show an alternative operation potentially applicable to any of the types of channel rail above described, in which longitudinal movement of a rail is dispensed with, and lateral movement for gauge alteration is effected directly. Only the modified parts are described, and these comprise slots 120 in a rail 121, the slots being engaged by studs 122, and the slots being virtually at right angles to the length of the rail. Direct lateral adjustment of the rail is achieved by a screw 123 mounted in a suitable bracket 124. The rail may be held against the screw by springs or other resilient means.

It should perhaps be mentioned that the inclined slots described above have in effect a cam action, and that an actual cam device may be substituted therefor if required.

What I claim is:

1. Slide mechanism comprising a pair of fixed slide elements having acutely disposed flanges, said slide elements being adapted to be mounted on a surface, a pair of complementary slide elements mounted on a surface near said first surface and having flanges adapted to cooperate with said first mentioned flanges, a slide rail slidably connected with one of said fixed slide elements and being normally engaged with the slide elements, screw means carried by said fixed slide elements and being adjustable for shifting the slide rail obliquely with respect to the slide elements to permit freeing of the slide elements, said slide rail and slide elements being adapted in locked posititon to assume binding engagement, said binding action taking place in a direction at right angles with respect to the direction of sliding of the slide rail.

2. In slide mechanism, a pair of parallel fixed slide elements, said elements being mounted on a seat, a pair of parallel fixed rail elements mounted on a surface beneath said seat, said rail elements being adapted to be disposed in cooperative relation, a slide rail slidably mounted on one of said first mentioned elements, a screw mounted on said mentioned element and being engageable with said slide rail, said slide rail having an oblique slot, a stud extending through said slot into the seat, said stud and slot confining said slide rail to oblique movement and said screw being adapted to urge said slide rail obliquely into unlocked relation with the cooperating slide elements for freeing all of said elements and said slide rail and permitting relative movement therebetween, and a spring carried by one of said elements and said slide rail and normally urging the rail to a position binding the slide elements and said slide rail in locked relation.

3. In slide mechanism, interengaging parallel slide elements, one of said elements being fixed and the other of said elements being slidable obliquely, said first mentioned element having a lug, a spring normally urging said last mentioned element in an oblique direction toward said first mentioned element to assume a binding locked position, a screw carried by said lug and being engageable with the slide element for shifting said element obliquely out of engagement with said fixed element whereby freeing of said elements will take place.

4. Slide mechanism comprising, in combination, a slide element carried on a seat member, a complementary slide element mounted on a supporting surface beneath the seat member, a slide rail parallel to said elements, means for mounting the slide rail on said first mentioned slide element for oblique movement with respect thereto, means normally urging the slide rail into binding engagement with both of the slide elements for locking the elements against relative movement, and a bolt carried by one of the slide elements and being engageable with the slide rail for shifting said slide rail out of engagement with the elements whereby said rail and elements will be freed and permitted to have relative movement.

5. Slide mechanism comprising, in combination, a pair of parallel rails adapted to be mounted on and project from a surface, said rails having acutely inclined flanges, a complementary pair of rails mounted on a surface beneath the first mentioned surface and projected toward said first mentioned pair of rails, said complementary pair of rails having flanges complementarily interengaging with the flanges of the first pair of rails, and means normally shifting certain of said rails laterally to cause interengaging flanges to press firmly against each other in binding relation for producing a component of force parallel with the surface, the inclination of said flanges producing a component at right angles to said surface.

6. Slide mechanism according to claim 5, comprising a fixed foundation rail slidably supporting the shiftable rail.

7. Slide mechanism according to claim 5, further comprising a fixed foundation rail slidably supporting said shiftable rail, pin and slot means for maintaining said shiftable rail in operative relation with said foundation rail, the slots being obliquely disposed with respect to the length of the rail, and screw means for adjusting the shiftable rail obliquely of the foundation rail.

8. Slide mechanism comprising, in combination, a first pair of channel section parallel rails projecting from a flat surface, a second pair of channel section rails projecting toward and parallel with said first pair and engaging same, outwardly acutely directed flanges on the four edges of said first pair, complementary inwardly acutely directed flanges on the four edges of said second pair, and means for shifting one of said rails laterally whereby one flange of each rail engages one flange of the complementary rail and produces a complement of pressure parallel with said surface and a component at right angles thereto.

9. Slide mechanism according to claim 8, further combining with said shifting rail, a mounting therefor including slots inclined to the length thereof, and screw means for adjusting said rail longitudinally and therefore shifting it laterally for freeing the parallel rails from each other and permitting relative longitudinal movement of said rails.

10. In a sliding seat mechanism, a seat, downwardly projecting upper rails carried by the seat and having flanges, complementary upwardly extending lower rails having acutely inclined flanges on the upper edges thereof, and means slidably mounted on one of said downwardly projecting upper rails and being adapted for movement between the flanges of said rails and locking said rails against relative movement, said means being shiftable for freeing the flanges and permitting relative movement of the rails.

11. In slide mechanism for a seat, pairs of interengaging slide elements, a slide member carried by one of the slide elements and automatically shiftable upon the same obliquely for locking the seat in an adjusted position, holding means carried by said slide member and confining said slide member to block movement into and out of engagement, said holding means comprising studs carried by one of said slide elements and extending through obliquely disposed slots in said slide member, and a screw engageable with said slide member for effecting oblique movement thereof, said slide member being adapted to be moved automatically into engagement with portions of the slide elements for locking said slide elements against relative movement, said screw being rotatable for shifting the slide member for freeing the slide elements.

ARTHUR WILLIAM CHAPMAN.